US012007065B2

(12) United States Patent
Ma

(10) Patent No.: US 12,007,065 B2
(45) Date of Patent: Jun. 11, 2024

(54) MOVABLE BASES FOR SHADE STRUCTURES

(71) Applicant: Zhun-An Ma, Ningbo (CN)

(72) Inventor: Zhun-An Ma, Ningbo (CN)

(*) Notice: Subject to any disclaimer, the term of this patent is extended or adjusted under 35 U.S.C. 154(b) by 66 days.

(21) Appl. No.: 17/806,051

(22) Filed: Jun. 8, 2022

(65) Prior Publication Data

US 2023/0003338 A1 Jan. 5, 2023

Related U.S. Application Data

(60) Provisional application No. 63/202,975, filed on Jul. 1, 2021.

(51) Int. Cl.
*F16M 11/42* (2006.01)
*E04H 12/22* (2006.01)
*F16M 11/20* (2006.01)

(52) U.S. Cl.
CPC ..... *F16M 11/2057* (2013.01); *E04H 12/2238* (2013.01); *F16M 11/42* (2013.01)

(58) Field of Classification Search
CPC ............... F16M 11/2057; F16M 11/42; F16M 2200/08; E04H 12/2238; E04H 12/2246; A45B 2023/0006
USPC ................................ 248/129, 346.01, 188.8
See application file for complete search history.

(56) References Cited

U.S. PATENT DOCUMENTS

| 1,261,142 | A | 4/1918 | McNichol |
| 1,711,831 | A | 5/1929 | Clavin |
| 1,838,199 | A | 12/1931 | Thomas |
| 1,940,523 | A | 12/1933 | Barclay |
| 2,036,033 | A | 3/1936 | Fisher |
| 2,146,658 | A | 2/1939 | Leopold |
| 2,475,406 | A | 7/1949 | Russell |
| 2,537,909 | A | * | 1/1951 | Puddester ................ A61G 5/00 280/43.24 |
| 2,652,845 | A | 9/1953 | O'Neill et al. |
| 2,661,012 | A | 12/1953 | Militano |
| 2,952,471 | A | 9/1960 | Thorpe |
| 3,025,058 | A | 3/1962 | Brumfield |
| 3,119,588 | A | 1/1964 | Keats |

(Continued)

FOREIGN PATENT DOCUMENTS

| CN | 201513683 | 6/2010 |
| DE | 93 13 372 | 10/1993 |

(Continued)

OTHER PUBLICATIONS

Activa Leisure, 2010 Product Catalog.

(Continued)

*Primary Examiner* — Bradley Duckworth
(74) *Attorney, Agent, or Firm* — Knobbe, Martens, Olson & Bear, LLP

(57) ABSTRACT

A movable base for a shade structure such as an umbrella that is operable between a movable configuration and a braked configuration. The movable base includes a first frame, including a plurality of wheels, such as caster wheels, and a second, e.g., movable, frame that is actuatable relative to the first frame and wheels. In the movable position, a plurality of feed are raised and the wheels are in contact with a ground surface. In the fixed position, the feet of the second frame are in contact with the ground and/or the wheels are raised.

20 Claims, 7 Drawing Sheets

(56) References Cited

U.S. PATENT DOCUMENTS

| | | |
|---|---|---|
| 3,179,438 A | 4/1965 | Field |
| 3,259,432 A | 7/1966 | Jackson |
| 3,353,837 A | 11/1967 | Marcyan |
| 3,372,855 A | 3/1968 | Keith |
| 3,606,445 A | 9/1971 | Wunderlich |
| 3,632,029 A | 1/1972 | Sonner |
| 3,633,242 A | 1/1972 | Wasofsky |
| 3,635,491 A | 1/1972 | Drews et al. |
| D223,689 S | 5/1972 | Forbes |
| 3,841,631 A | 10/1974 | Dolan |
| 3,949,901 A | 4/1976 | Tokita |
| 4,000,750 A | 1/1977 | Becher |
| 4,063,616 A | 12/1977 | Gutierrez |
| 4,069,559 A | 1/1978 | Weman |
| D255,958 S | 7/1980 | Browning |
| 4,249,282 A | 2/1981 | Little |
| 4,296,693 A | 10/1981 | Archer |
| 4,586,525 A | 5/1986 | Glatz et al. |
| 4,591,126 A | 5/1986 | Berney |
| D286,116 S | 10/1986 | Tegze |
| D295,004 S | 4/1988 | Schulz |
| 4,790,029 A | 12/1988 | LaFleur et al. |
| D305,702 S | 1/1990 | Taliani et al. |
| 4,903,859 A | 2/1990 | Derby et al. |
| 4,973,327 A | 11/1990 | Goodrich, Jr. et al. |
| 5,035,445 A * | 7/1991 | Poulin ........................ B60T 1/14 280/79.11 |
| D323,582 S | 2/1992 | Volcani |
| 5,104,236 A | 4/1992 | LaFleur |
| 5,152,495 A | 10/1992 | Jacinto et al. |
| 5,158,369 A | 10/1992 | Derby |
| 5,167,393 A | 12/1992 | Hayakawa et al. |
| 5,207,407 A | 5/1993 | Fitzsimmons et al. |
| 5,209,364 A | 5/1993 | LaPoint, Jr. |
| 5,220,740 A | 6/1993 | Brault |
| 5,248,140 A | 9/1993 | Matherne et al. |
| 5,257,983 A | 11/1993 | Garyantes et al. |
| 5,259,612 A | 11/1993 | Matherne et al. |
| 5,271,196 A | 12/1993 | Fanti |
| 5,283,595 A | 2/1994 | Krukovsky |
| 5,289,937 A | 3/1994 | Boots |
| 5,322,023 A | 6/1994 | Hammond |
| 5,323,922 A | 6/1994 | Lapoint et al. |
| 5,328,268 A | 7/1994 | Lafleur |
| 5,330,213 A | 7/1994 | Peruso |
| D350,041 S | 8/1994 | Schwarzli |
| 5,337,989 A | 8/1994 | Apple |
| 5,354,049 A | 10/1994 | Matherne et al. |
| 5,375,835 A | 12/1994 | Van Nimwegen et al. |
| 5,423,611 A | 6/1995 | Sherrard |
| 5,452,877 A | 9/1995 | Riffle et al. |
| 5,465,529 A | 11/1995 | Park |
| 5,480,191 A | 1/1996 | Litin et al. |
| 5,481,822 A | 1/1996 | Engels |
| 5,492,429 A | 2/1996 | Hodges |
| 5,520,982 A | 5/1996 | Grigsby et al. |
| D371,902 S | 7/1996 | Lee |
| 5,538,155 A | 7/1996 | Hoekstra |
| 5,599,037 A | 2/1997 | Spickler |
| 5,615,451 A | 4/1997 | Peterson et al. |
| 5,628,522 A | 5/1997 | Hall |
| 5,628,523 A | 5/1997 | Smith |
| 5,636,649 A | 6/1997 | Horvath |
| 5,730,668 A | 3/1998 | Hege et al. |
| 5,743,283 A | 4/1998 | Horvath |
| 5,823,213 A | 10/1998 | Patarra |
| 5,826,850 A | 10/1998 | Goldsmith |
| 5,839,714 A | 11/1998 | Fitzsimmons et al. |
| 5,843,556 A | 12/1998 | Levas |
| 5,865,541 A | 2/1999 | Lafleur |
| 5,871,148 A | 2/1999 | Hafer |
| D411,341 S | 6/1999 | Lee |
| D411,342 S | 6/1999 | Lee |
| 5,940,932 A | 8/1999 | LaHay |
| 5,957,145 A | 9/1999 | Plumer |
| 5,964,533 A | 10/1999 | Ziglar |
| 5,968,204 A | 10/1999 | Wise |
| 5,979,793 A | 11/1999 | Louis |
| 6,000,549 A | 12/1999 | Perkins |
| 6,015,057 A | 1/2000 | Stone et al. |
| D426,985 S | 6/2000 | Casalino |
| 6,089,394 A | 7/2000 | Ziglar |
| 6,102,569 A | 8/2000 | Wang |
| 6,105,305 A | 8/2000 | Edens |
| 6,109,786 A | 8/2000 | Hafer et al. |
| 6,113,054 A | 9/2000 | Ma |
| 6,113,270 A | 9/2000 | Hafer |
| 6,149,025 A | 11/2000 | Wang |
| 6,196,719 B1 | 3/2001 | Brown |
| 6,203,198 B1 | 3/2001 | Stone |
| 6,220,755 B1 | 4/2001 | Brown et al. |
| 6,230,724 B1 | 5/2001 | Lai |
| 6,305,659 B1 | 10/2001 | Metelski |
| 6,328,470 B2 | 12/2001 | Brown et al. |
| 6,336,450 B1 | 1/2002 | Collet |
| 6,367,494 B1 | 4/2002 | Tung |
| 6,374,839 B2 | 4/2002 | Patarra |
| 6,405,990 B2 | 6/2002 | Davis et al. |
| 6,412,746 B2 | 7/2002 | Davis et al. |
| 6,412,747 B2 | 7/2002 | Davis et al. |
| 6,415,927 B1 | 7/2002 | Stone et al. |
| 6,446,408 B1 | 9/2002 | Gordin et al. |
| 6,446,930 B1 | 9/2002 | Li |
| D464,190 S | 10/2002 | Salahub |
| 6,481,591 B2 | 11/2002 | Mendoza et al. |
| 6,488,254 B2 | 12/2002 | Li |
| 6,511,033 B2 | 1/2003 | Li |
| D470,305 S | 2/2003 | Clarke |
| 6,523,640 B1 | 2/2003 | Young et al. |
| 6,554,012 B2 | 4/2003 | Patarra |
| 6,554,243 B2 | 4/2003 | Davis et al. |
| 6,565,060 B2 | 5/2003 | Li et al. |
| 6,585,219 B2 | 7/2003 | Li |
| 6,594,951 B1 | 7/2003 | Reynolds |
| 6,637,717 B2 | 10/2003 | Li |
| D484,303 S | 12/2003 | Taylor |
| 6,658,760 B2 | 12/2003 | Kohlman et al. |
| 6,669,045 B2 | 12/2003 | Wang |
| D485,055 S | 1/2004 | Taylor |
| 6,682,055 B1 | 1/2004 | Tomlinson et al. |
| 6,732,752 B2 | 5/2004 | Cohen et al. |
| 6,796,319 B1 | 9/2004 | Patarra et al. |
| 6,869,058 B2 | 3/2005 | Tung |
| 6,877,708 B1 | 4/2005 | Thurner |
| 6,889,953 B2 | 5/2005 | Harbough |
| D516,297 S | 3/2006 | Smith et al. |
| 7,090,399 B2 | 8/2006 | Godshaw et al. |
| 7,140,581 B1 | 11/2006 | White |
| 7,143,601 B1 | 12/2006 | Jimenez |
| 7,163,212 B1 | 1/2007 | Rupp |
| 7,195,397 B2 | 3/2007 | Williamson et al. |
| 7,216,839 B2 | 5/2007 | Xiaoqiu |
| 7,285,111 B2 | 10/2007 | Gaster |
| 7,331,684 B2 | 2/2008 | Tung |
| 7,347,428 B2 | 3/2008 | Edenso |
| D568,603 S | 5/2008 | Smith et al. |
| D573,786 S | 7/2008 | Smith et al. |
| D574,143 S | 8/2008 | Smith et al. |
| D578,749 S | 10/2008 | Ng |
| 7,431,259 B2 | 10/2008 | Tung |
| 7,484,704 B2 | 2/2009 | Schommertz |
| 7,503,541 B2 | 3/2009 | Harold et al. |
| 7,513,479 B2 | 4/2009 | Li |
| 7,520,485 B1 | 4/2009 | Giannetto |
| 7,537,015 B1 | 5/2009 | Molnar, IV et al. |
| 7,575,117 B2 | 8/2009 | Redzisz et al. |
| 7,584,563 B2 | 9/2009 | Hillstrom et al. |
| 7,600,917 B2 | 10/2009 | Richardson, Jr. |
| 7,614,600 B1 | 11/2009 | Smith et al. |
| 7,641,165 B2 | 1/2010 | Li |
| 7,644,903 B2 | 1/2010 | Amato et al. |
| D612,146 S | 3/2010 | Clarke |
| D617,041 S | 6/2010 | Shi |
| 7,753,546 B2 | 7/2010 | Kuelbs |

(56) References Cited

U.S. PATENT DOCUMENTS

| | | |
|---|---|---|
| D621,148 S | 8/2010 | Brady |
| D621,149 S | 8/2010 | Brady |
| 7,780,139 B2 | 8/2010 | Markert |
| 7,784,761 B2 | 8/2010 | Ma |
| D625,528 S | 10/2010 | Sprague |
| 7,836,902 B2 | 11/2010 | Tung |
| 7,891,633 B2 | 2/2011 | Li |
| 7,958,901 B2 | 6/2011 | Lai |
| 8,070,006 B2 | 12/2011 | Austin et al. |
| 8,104,492 B2 | 1/2012 | Dan |
| D655,531 S | 3/2012 | Gharst |
| D668,443 S | 10/2012 | Sims, II |
| D677,075 S | 3/2013 | Rodgers |
| 8,485,757 B2 | 7/2013 | Nomoto |
| 8,522,804 B1 | 9/2013 | Tung |
| D691,839 S | 10/2013 | Dallenbach |
| 8,556,100 B2 | 10/2013 | Austin et al. |
| 8,567,729 B2 | 10/2013 | Nemish |
| D697,705 S | 1/2014 | Ma |
| 8,632,045 B2 | 1/2014 | Ma |
| 8,657,246 B2 | 2/2014 | Ma |
| 8,672,287 B2 | 3/2014 | Li |
| 8,714,511 B2 | 5/2014 | Zoeteman |
| 8,807,513 B2 | 8/2014 | Volin |
| 8,833,709 B2 | 9/2014 | Weng |
| 8,894,281 B2 | 11/2014 | Town et al. |
| 8,919,361 B2 | 12/2014 | Ma |
| 8,919,722 B2 | 12/2014 | Ma |
| D722,796 S | 2/2015 | Lievore |
| 8,960,625 B2 | 2/2015 | Ma |
| D724,309 S | 3/2015 | Ma |
| 9,038,325 B1 | 5/2015 | Callahan |
| D732,817 S | 6/2015 | Elstow |
| D740,546 S | 10/2015 | DeVaney |
| 9,271,550 B2 | 3/2016 | Xiong |
| D761,601 S | 7/2016 | Simmons |
| D768,978 S | 10/2016 | Ma |
| D771,935 S | 11/2016 | Ma |
| D775,461 S | 1/2017 | Ma |
| 9,540,840 B2 | 1/2017 | Ma |
| D785,380 S | 5/2017 | King |
| D817,631 S | 5/2018 | Weng |
| 9,957,728 B2 | 5/2018 | Ma |
| D833,136 S | 11/2018 | Ma |
| D855,967 S | 8/2019 | Ma |
| 11,365,557 B2 | 6/2022 | Ma |
| 11,519,193 B2 | 12/2022 | Ma |
| 2001/0013358 A1 | 8/2001 | Patarra |
| 2001/0032916 A1 | 10/2001 | Wess et al. |
| 2001/0040208 A1 | 11/2001 | Li |
| 2001/0045498 A1 | 11/2001 | Davis et al. |
| 2002/0023995 A1 | 2/2002 | Yoshida et al. |
| 2002/0185582 A1 | 12/2002 | Li |
| 2003/0145498 A1 | 8/2003 | Venegas, Jr. |
| 2003/0156891 A1 | 8/2003 | Hung et al. |
| 2003/0230692 A1 | 12/2003 | Davis et al. |
| 2004/0056169 A1 | 3/2004 | Harbough |
| 2004/0069922 A1 | 4/2004 | Wu |
| 2004/0108439 A1 | 6/2004 | Ma |
| 2004/0129854 A1 | 7/2004 | Schmitz |
| 2004/0163336 A1 | 8/2004 | Hsu |
| 2004/0177871 A1 | 9/2004 | Harbough |
| 2004/0195487 A1 | 10/2004 | Harbough |
| 2005/0023428 A1 | 2/2005 | Woude et al. |
| 2005/0161067 A1 | 7/2005 | Hollins |
| 2005/0189005 A1 | 9/2005 | Smith et al. |
| 2006/0054206 A1 | 3/2006 | Bilotti |
| 2006/0102822 A1 | 5/2006 | Liang |
| 2007/0080277 A1* | 4/2007 | Chen .................. E04H 12/2246 248/354.3 |
| 2007/0102599 A1* | 5/2007 | Lin ....................... B62B 5/0083 248/129 |
| 2008/0093528 A1 | 4/2008 | Tsai et al. |
| 2008/0111046 A1 | 5/2008 | Tung |
| 2009/0174162 A1 | 7/2009 | Gass et al. |
| 2009/0314912 A1 | 12/2009 | Whitley et al. |
| 2009/0320341 A1 | 12/2009 | Hillstrom et al. |
| 2010/0050706 A1 | 3/2010 | O'Neill |
| 2010/0065709 A1 | 3/2010 | Ying |
| 2010/0147341 A1 | 6/2010 | Li |
| 2010/0206346 A1 | 8/2010 | Tung |
| 2011/0232704 A1 | 9/2011 | Li |
| 2012/0024330 A1 | 2/2012 | Ma |
| 2012/0025050 A1* | 2/2012 | Ma .......................... F16H 21/54 74/532 |
| 2012/0126388 A1 | 5/2012 | Kuo |
| 2013/0134285 A1 | 5/2013 | Weng |
| 2013/0146739 A1 | 6/2013 | Zhao |
| 2014/0230866 A1 | 8/2014 | Paolucci |
| 2014/0252191 A1 | 9/2014 | Lai |
| 2014/0263926 A1 | 9/2014 | LeAnna |
| 2015/0076313 A1 | 3/2015 | Ma |
| 2017/0114563 A1* | 4/2017 | Ye .......................... A45B 23/00 |
| 2018/0099180 A1 | 4/2018 | Wilkinson |
| 2019/0063103 A1* | 2/2019 | Siegenthaler ....... E04H 12/2238 |
| 2019/0090964 A1 | 3/2019 | Rosenberg |
| 2019/0281720 A1 | 9/2019 | Jean et al. |
| 2019/0301670 A1 | 10/2019 | Glickstein et al. |
| 2020/0141150 A1 | 5/2020 | Ma |
| 2020/0208429 A1 | 7/2020 | Ma |

FOREIGN PATENT DOCUMENTS

| | | |
|---|---|---|
| DE | 202006002271 U1 | 6/2006 |
| DE | 2020 1710 2218 U1 | 6/2017 |
| EP | 0 060 957 | 9/1982 |
| EP | 0 818 594 | 1/1998 |
| EP | 0 822 305 | 2/1998 |
| EP | 2 565 350 B1 | 12/2014 |
| FR | 2 576 048 | 7/1986 |

OTHER PUBLICATIONS

Treasure Garden, 2010 Product Catalog.

Ambiente The XXL Free-Arm Sunshade, Glatz AG, Jan. 1, 2017, in 6 pages.

Sonnenschirm Akzento®, Montage- und Gebrauchsanleitung Akzento®, Glatz AG, 2005 o 16 pages.

Extended European Search Report issued in European Patent Application No. 14185666.6, dated Jun. 24, 2015.

* cited by examiner

MOVABLE BASES FOR SHADE STRUCTURES

BACKGROUND

Field

The present disclosure generally relates to mobile bases for supporting an umbrella, or other structure.

Related Art

Large umbrellas and other shade structures assemblies can be very difficult to move without a wheeled base because of the weight and/or shape of the umbrellas. However, wheeled movable bases can be problematic if the wheels allow for unwanted movement. Wind and other forces can move or turn an umbrella out of a desired position, especially when supported on a wheeled base.

SUMMARY OF THE INVENTION

One aspect of the present disclosure is an movable base that includes a first frame that includes a set of wheels, such as caster wheels. The movable base also includes a second frame that is actuatable relative to the first frame. The second frame includes a plurality of feet or other structures that contact the ground to lift the first frame and the wheels out of the contact with the ground surface and thereby fix the position of the umbrella. A screw actuator couples between the second frame and the first frame to transition the movable base between a braked configuration with the second frame contacting the ground and a movable configuration with the second frame lifted above the ground and the movable base resting on the wheels.

According to another aspect, the movable base can include a lever arm that is coupled at one end with a screw of the screw actuator. Rotation of the screw in a first direction can actuate the lever to move the movable base into the braked configuration. Rotation of the screw in the opposite direction can actuate the lever to move the movable base into the movable configuration. The screw actuator can be accessible by a user through an outer cover by a user.

In another embodiment, a movable base is provided that includes a first frame assembly, a second frame assembly, a cover and an actuator. The first frame assembly includes an upper channel member and two spaced apart lower channel members. The lower channel members each couple with a wheel assembly. The second frame assembly can be coupled with the first frame assembly. The second frame assembly can include a lever and a plurality of feet coupled with the lever. The cover can enclose the first frame assembly and the second frame assembly. The actuator can be accessible at an outside surface of the cover. The actuator can be configured to move a first end of the lever to cause the feet to be extended in a direction away from a bottom surface of the lower channel members to cause the feet to bear at least a portion of the weight of the movable base. The feet thus provide a braking effect reducing or eliminating movement of the movable base.

In some embodiments, a movable base has a cowl forming a cover.

In some embodiments, the movable base has a superstructure. The superstructure can be disposed between the cowl or other cover and internal components, such as a frame assembly.

In some embodiments, the movable base can have a superstructure having one or more walls for containing a portion of an actuator. In some embodiments, the movable base can have a superstructure having one or more support surface for containing and/or supporting a portion of the actuator.

In some embodiments, the movable base can have an actuator that comprises a screw having a first end coupled with a lever and a second end having a driver interface. The second end can be accessible at an outside of the cover.

In some embodiments, the movable base can have one or more slots disposed through a frame assembly and one or more shafts or slides disposed through the slots. The shafts or slides can transfer pivoting motion of the lever to vertical motion of the feet.

In some embodiments, the movable base can have a transverse member coupled with the lever. The transverse member can have or be coupled with feet at each end thereof. The transverse member can be coupled with shafts or slides of a frame assembly at spaced apart locations between the feet. The transverse member can move along a travel distance within one or more lower channel members upon actuation of an actuator.

BRIEF DESCRIPTION OF THE DRAWINGS

Features of the invention can be better understood from the following detailed description when read in conjunction with the accompanying schematic drawings, which are for illustrative purposes only. The drawings include the following figures.

DETAILED DESCRIPTION OF THE PREFERRED EMBODIMENT

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

Figure 1B:
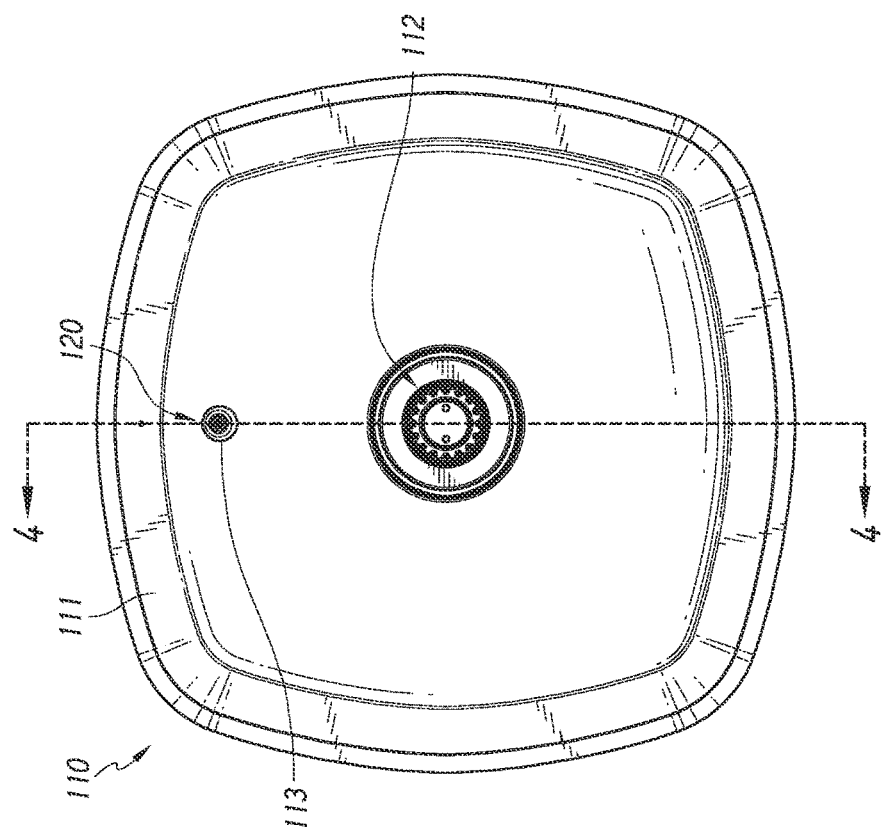
FIG. 1B is a top view of the movable base.
Figure 1A:
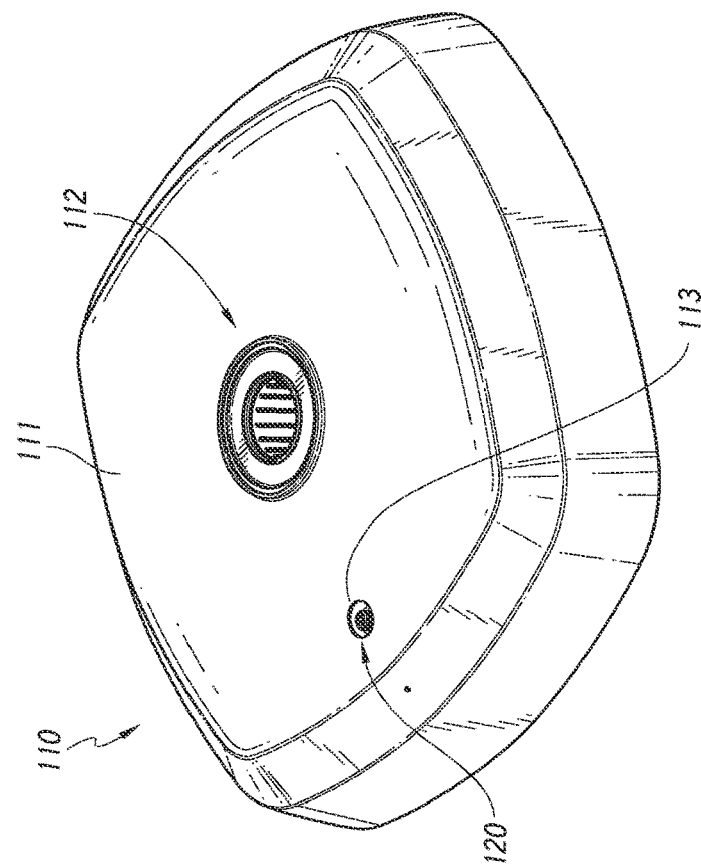
FIG. 1A is a perspective view of a movable base including a screw actuator that is accessible through an outer cowl.

FIGS. 1A-1B show a movable base 110. Although the movable base 110 is described herein in terms of an umbrella base, it can alternatively be used in conjunction with other types of shade structures. The movable base 110 can be any shape or size such that it provides stability to an attached shade structure. The movable base 110 can include a mounting portion 112. The mounting portion 112 may be located directly in the center of the movable base 110 or elsewhere thereon. The mounting location 112 can include an aperture, such as a cylindrical aperture, for receiving a lower end of an upright pole of an umbrella assembly. The mounting location 112 can also include one or more apertures for receiving screws that further secure a position of the upright pole. In certain implementations, the movable base 110 can include ballast tanks or weights (not shown).

The movable base 110 can include an exterior or outer cowl 111. The cowl 111 can be removable. When not removed, the cowl 111 covers any underlying structures that provide support to the movable base 110 and one or more frame members, as discussed further herein. The cowl 111 can be made out of a thin plastic material, or other type of material. The cowl 111 can include an aperture aligned with the mounting location 112.

The movable base 110 can include an actuator that can be accessed through the cowl 111. The actuator can be a screw actuator 120 in one embodiment. The screw actuator 120 can be accessible through an aperture 113 in the exterior cowl 111. The aperture 113 may include an additional removable or movable cover to block access to the screw actuator 120 when not in use. The screw actuator 120 can be accessible through an upper side of the cowl 111. In other implementations, the screw actuator 120 can be located on a front or side surface of the movable base 110.

Figure 2B:
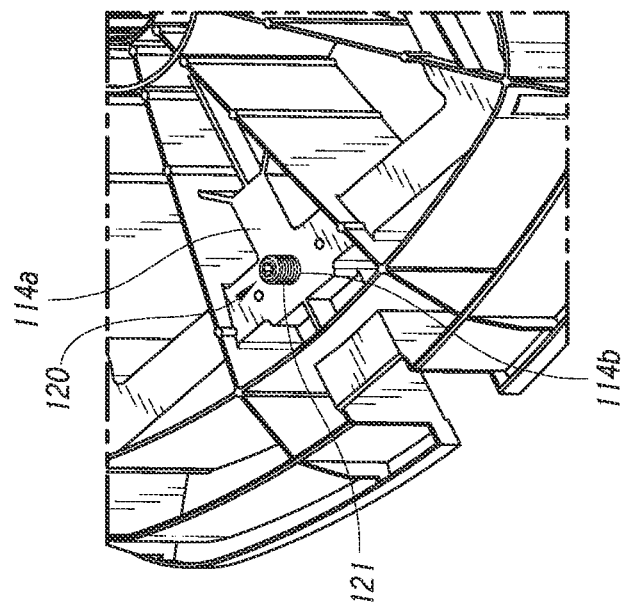
FIG. 2B is a detail taken of FIG. 2A with the screw plate removed for clarity.
Figure 2A:
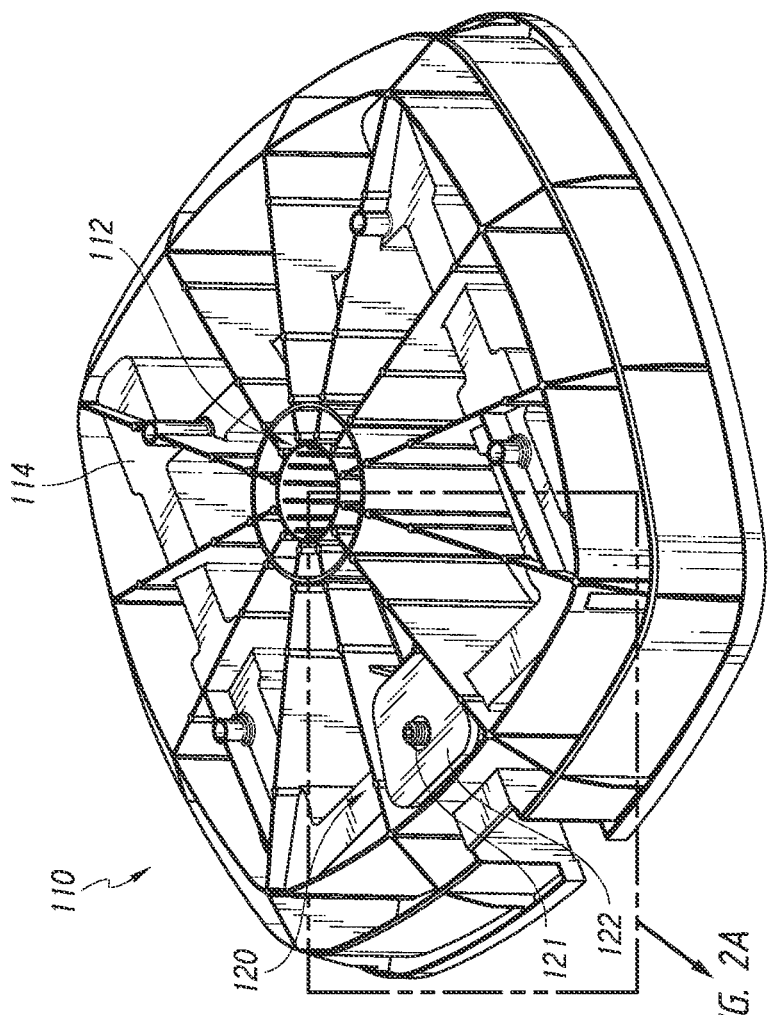
FIG. 2A shows the movable base with the outer cowl removed and showing further detail of the screw actuator, the screw actuator including a screw and a screw plate.

FIGS. 2A-2B illustrate internal components of the movable base 110 with the exterior cowl 111 removed for clarity to show a superstructure 114. The superstructure 114 can comprise a plurality of support structures that provide rigidity and strength to the movable base 110 including the mounting location 112. The superstructure 114 can include a plurality of radial and/or circumferential ribs that extend outwardly from the mounting location 112 to an outer periphery of the movable base 110. The ribs of the superstructure 114 can be vertically oriented and/or include one or more additional linking ribs therebetween. Other configurations for the superstructure 114 are also contemplated herein.

The screw actuator 120 can include a screw member 121 and a matching threaded member, such as a screw plate 122. The screw plate 122 can be coupled in a fixed manner with the superstructure 114 (or alternatively with a first or fixed frame of the movable base as described below). The screw plate 122 can be positioned on a supporting surface, feature projection, slot or other mechanical support or supporting member 114a of the superstructure 114 and/or fixed thereto. The supporting member 114a for the screw plate 122 can be located between the radial ribs of the superstructure 114. Optionally, the screw plate 122 can be fixed to the superstructure 114 or to another a rigid structure of the movable base 110 by one or more mechanical fasteners such as screws, bolts, clasps, or the like. The screw plate 122 can include an aperture having one or more threads therein that receive and mate with exterior threads of the screw 121. Accordingly, rotation of the screw 121 relative to the screw plate 122 cause the linear motion of the screw 121 through the plate 122. The screw 121 can be mounted vertically and can move along the vertical direction, either up or down, depending on the direction of rotation. The screw 121 can extend through an aperture 114b in the supporting member 114a. The lower end of the screw 121 can be engaged with a second or movable frame 130 of the movable base 110, as described further below. Although the screw 121 and screw plate 122 is one advantageous manner of actuating a braking assembly of the movable base 110 other mechanisms providing a load, e.g., a linear load, a vertical load, a compressive load, can be used to actuate the braking assembly.

Figure 3:
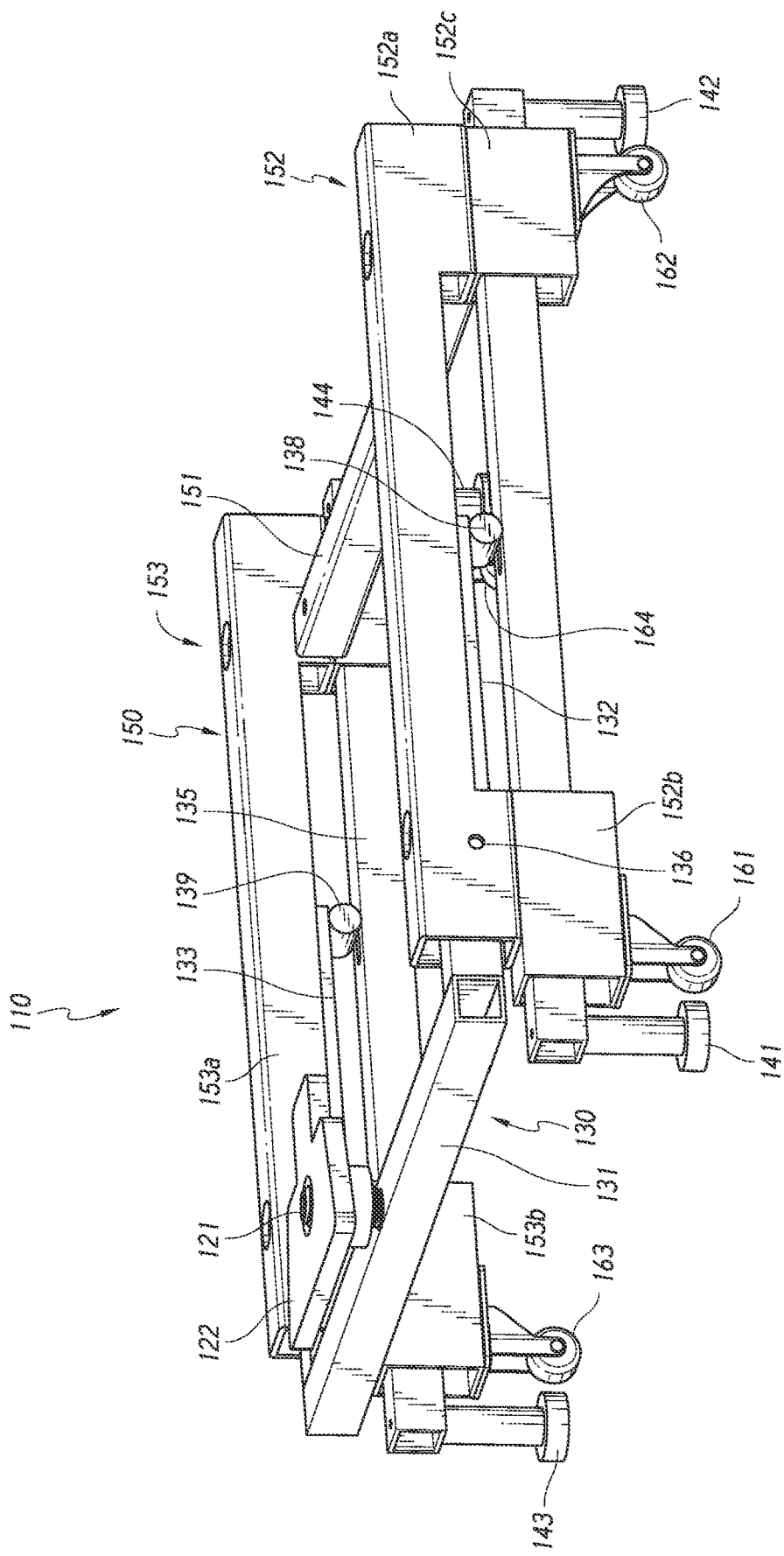
FIG. 3 is a perspective view of internal structure of the movable base of FIGS. 1A and 1B in a movable configuration, the internal structure including a first frame and a second or vertically displaceable frame.

FIG. 3 shows the movable base 110 with the exterior cowl 111 and the superstructure 114 removed to illustrate a first or fixed frame 150 and a second or movable frame 130. The first frame 150 can be generally fixed in one or more locations with the superstructure 114. The superstructure 114 can include various internal apertures, spaces, or cavities for receiving therein portions of the first frame 150 and/or the second frame 130. The first frame 150 can include a plurality of members, such as linear member. The members can be connected to each other and/or the superstructure 114 via mechanical fasteners, welding, or other means.

The first frame 150 can include a lateral member 151. The lateral member 151 can extend between a first side 152 and a second side 153 of the first frame 150. The first side 152 can be aligned generally perpendicular to the first member 151. The second side 153 can be aligned generally perpendicular to the member 151. Together the first side 152, the second side 153 and the lateral member 151 can form a U-shape. The U-shape can extend generally along three sides of the movable base 110. Other shapes are possible. For example, the lateral member 151 could be in a more central position of the movable base 110 providing an I-shape. This configuration would be suitable for an movable base with a higher position of a bottom of the mounting location 112. Also, additional lateral members could be provided to create a quadrilateral (e.g., square) shaped frame assembly.

The first side 152 can include an upper member 152a. The upper member 152a can be an upper channel member. The upper member 152a can be generally formed as an elongate rectangular member having a hollow space therein and/or one or more cutout portions. The first side 152 can include a first lower member 152b and a second lower member 152c. The first and second lower members 152b, 152c can be connected to each other and/or formed integrally with the upper member 152a. The first and second lower members 152b, 152c can be lower channel members. The first and second lower members 152b, 152c can also be rectangular members having planar upper sides. The planar upper sides can interface and attach with a lower face of the upper member 152a. Each of the first and second lower members 152b, 152c can also include therethrough a hollow space. As discussed further below, the hollow space defined in the first and second lower members 152b, 152c can correspond to a throw or travel distance of a braking assembly disclosed herein. In other words, parts of the second frame 130 can move within the first and second lower members 152b, 152c along a path with a first end corresponding to the movable configuration and a second end corresponding to a braked configuration with no or limited rolling or movement. The lateral member 151 can be connected with any one or more of the components of the first side 152.

The first side 152 can include a first wheel 161 and a second wheel 162. The first wheel 161 can be connected with the first lower member 152b. The second wheel 162 can be connected with the second lower member 152c. The first and second wheels 161, 162 can be caster wheels that allow pivoting and rolling of a wheel member. The wheels 161, 162 can be connected with lower faces of the respective first and second lower members 152b, 152c. The wheels 161, 162 can be connected with one or more faces including or other than the lower faces of the respective first and second lower members 152b, 152c.

The second side 153 can have the same configuration as the first side 152. For example, the second side 153 can also include an upper member 153a, a first lower member 153b, and/or a second lower member 153c. Each of the members 153a-c can include a hollow space therein and/or be formed as rectangular elongate members. The upper member 153a can include one or more planar faces to which upper planar faces of the first and second lower members 153b, 153c can be attached. A third wheel 163 can be attached with the first lower member 153b on a lower surface thereof. A fourth wheel 164 can be attached with the second lower member 153c on a lower surface thereof. The third and fourth wheels 163, 164 can be caster wheels.

The second frame 130 can include a lateral member 131, a first lever member 132 and/or a second lever member 133. The lateral member 131 and the first and second lever members 132, 133 can form a U-shape. More generally, the second frame 130 preferably has a pivot or lever arm with a diverging shape such that the end of the frame 130 opposite the lateral member 131 is wider adjacent to the lateral member. A V-shaped lever arm of a second frame 130 is also possible. The U-shape can extend generally along three sides of the movable base 110. The lateral member 131 can be located opposite the lateral member 151 on the movable base 110. The first lever member 132 can be disposed within the hollow space of the upper member 152a. The lateral member 132 can be a lever pivotally coupled about an axis 136 (e.g., using a pin or other mechanism). The axis 136 can be located within the upper member 152a. A first end of the lever member 132 can be connected with the lateral member 131 outside of the upper member 152a. A second end of the lever member 132 can be engaged with a pivot point 138 (e.g., extending through a cutout portion of the upper member 152a).

As discussed further below, the hollow space defined in the upper member 152a can correspond to a pivot distance of the lever arm. In other words, the portion of pivot arm adjacent to the lateral member 131 sweeps a circumferential path that is accommodated by the top and bottom inside surface of the upper member 152a a path with a first end of the circumferential path corresponding to a free rolling state and a second end of the circumferential path corresponding to a braked state with no or limited rolling or movement. The height of the internal space of the upper member 152a can be the same as the height of the internal space of the first and second lower members 152b, 152c. The height of the internal space of the upper member 152a can be less than the height of the internal space of the first and second lower members 152b, 152c when the axis 136 is closer to the lateral member 131 than to the pivot point 138.

The pivot point 138 can comprise a cylindrical member to reduce friction with the second end of the lever member 132. The pivot location 138 can be coupled with a first translating member 134. The first translating member 134 can be configured to move vertically either up and down relative to the first frame 150. The cylindrical member of the pivot point 138 can reduce friction with the first translating member 134. The first translating member 134 can be disposed within the hollow spaces of the first lower member 152b and/or the second lower member 152c. The first translating member 134 can be mounted on slides or shafts, as described further below. The first translating member 134 can include first and second feet 141, 142. A first end of the translating member 134 can include or be coupled with the first foot 141. A second end of the translating member 134 can include or be coupled with the second foot 142. The first and second feet 141, 142 and/or the first and second ends of the translating member 134 can be disposed outside of, e.g., can each overhang, the respective first and second lower members 152b, 152c. The first foot 141 and the second foot 142 can be disposed forwardly and rearwardly, respectively, of the first and second wheels 161, 162, as shown in FIG. 3. In other embodiments, one or more of the first and second feet 141, 142 are disposed between the respective first and second lower members 152b, 152c. The first translating member 134 can be movable in the vertical direction within the hollow space of the first and second lower members 152b, 152c. The lever member 132 can be rotatable within the hollow space or at least partially within the hollow space of the upper member 152a about the axis 136. Rotation of the first lever member 132 about the pivot axis 136 in a first direction (e.g., upward) can engage the second end with the pivot location 138 to cause downward translation of the first translation member 134 and the first and second feet 141, 142 relative to the wheels 161, 162. Rotation of the first lever member 132 about the pivot axis 136 in a second direction opposite the first direction (e.g., downward) can cause upward translation of the first translation member 134 and the first and second feet 141, 142 relative to the wheels 161, 162 (or otherwise allow the weight of the umbrella and/or movable base 110 to move the wheels 161, 162 into contact with a ground surface).

The configuration and operation of the second lever member 133 can be similar to or the same as that of the first lever member 132. For example, the second lever member 133 can be disposed within the hollow space of the upper member 153a and pivotally coupled therewith by a pin or other mechanism at an axis 137 that can extend through the upper member 153a. A first end of the second lever member 133 can be connected with the lateral member 131 and a second end can be coupled with a second translating member 135 at a pivot location 139. The pivot location 139 can include a cylindrical member attached with the second translating member 135. The second translating member 135 can be disposed within the hollow spaces of the first and second lower members 153b, 153. The second translating member 135 can be disposed on slides or shafts that facilitate and enable translation along a vertical direction. The second translating member 135 can include a third foot 143 and a fourth foot 144. The third and fourth feet 143, 144 can be disposed on respective first and second ends of the second translating member 135. The first and second ends and/or the third and fourth feet 143, 144, respectively, can be exposed exteriorly to the first and second lower portions 153b, 153c. The third and fourth feet 143, 144 can be disposed forwardly and rearwardly of the third and fourth wheels 163, 164, respectively. Pivoting of the lever member 133 about the pivot axis 137 in the first direction can move the second translating member 135 downwards along the vertical direction to extend the third and fourth feet 143, 144 relative to the third and fourth wheels 163, 164. Rotation of the second lever member 133 about the pivot axis 137 in the second direction can cause upward translation of the second translation member 135 and the third and fourth feet 143, 144 relative to the wheels 163, 164 (or otherwise allow the weight of the umbrella and/or movable base 110 to move the wheels 163, 164 into contact with a ground surface).

Figure 4:
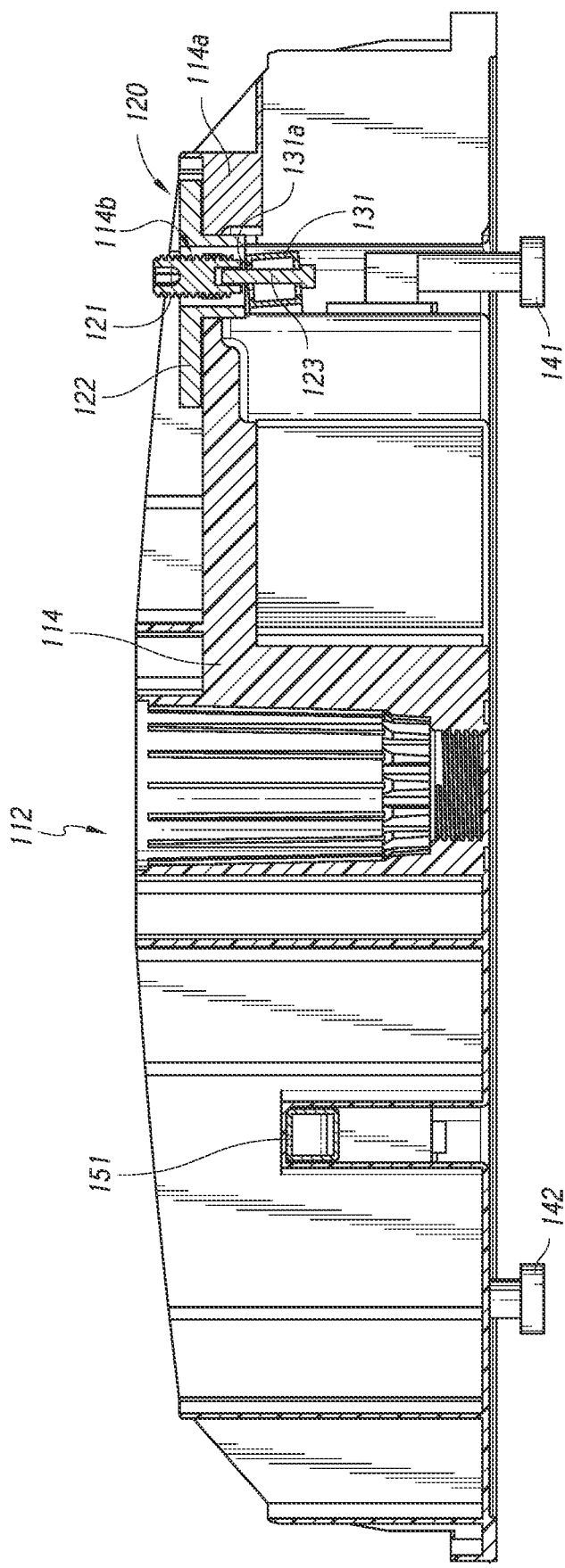
FIG. 4 is a section view taken along the line 4-4 in FIG. 1B and shows further detail of the screw actuator and connection with the second frame.

As shown in FIG. 4, the screw 121 can be engaged with the lateral member 131 of the second frame 130. The screw 121 can be coupled with a pin 123 that is received within a slot 131a of the lateral member 131. Accordingly, a direction of rotation of the screw 121 (e.g., clockwise or counterclockwise) relative to the screw plate 122 can actuate the lateral member 131 in the first or second directions to raise of lower the feet relative to the wheels. The lateral member 131 connected with the first and second lever members 132, 133 can actuate the first and second translation member 134, 135 to raise/lower the feet 141-144. Thus, the second frame 130 and the first frame 150, as well as the feet 141-144 and the screw 121 and other corresponding components comprise portions of a braking assembly of the umbrella assembly 110.

Figure 5:
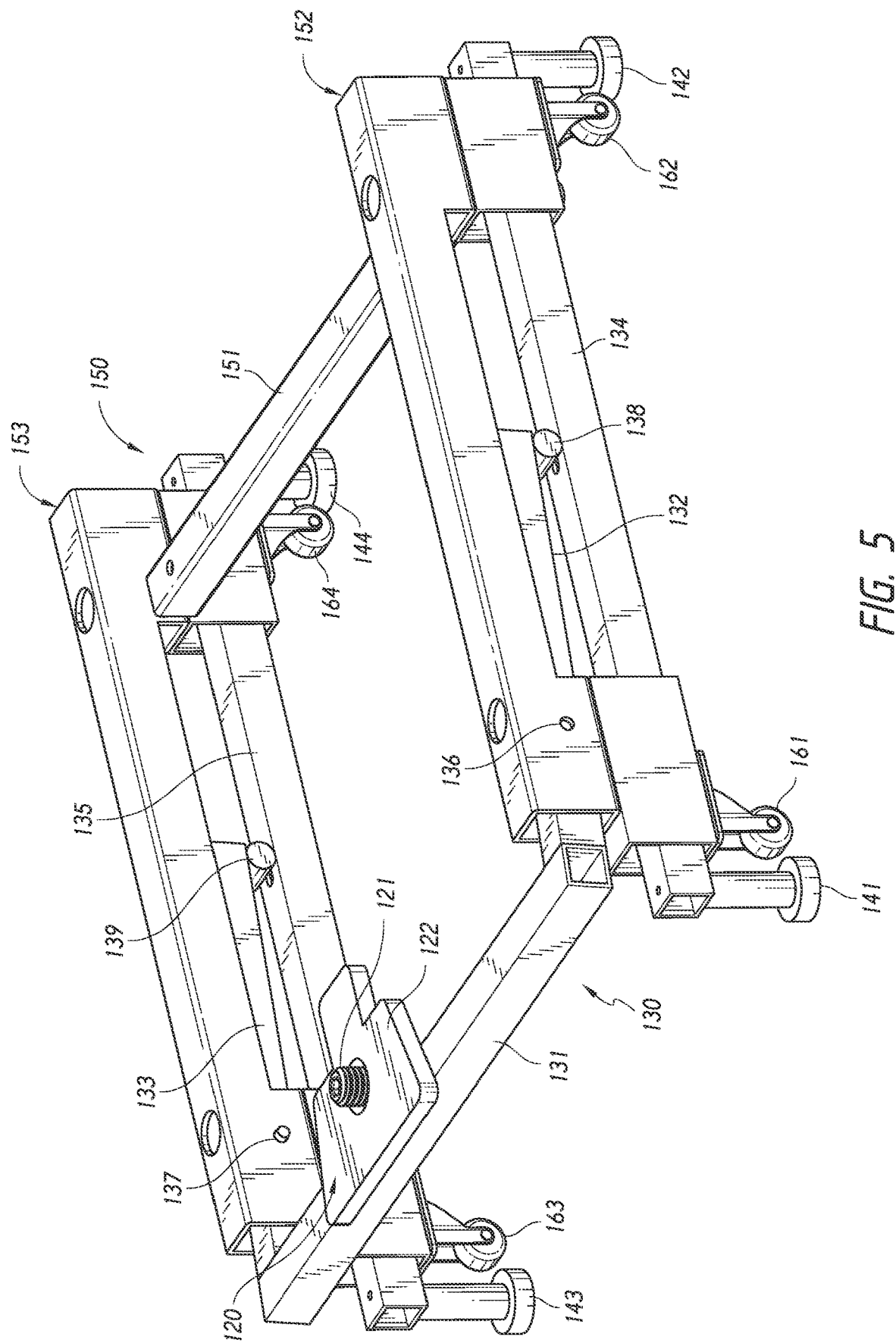
FIG. 5 shows the internal components of the movable base of FIGS. 1A and 1B in a configuration preventing or restricting rolling motion of the wheels.

FIG. 5 shows the movable base 110 in the fixed or braked configuration eliminating or limiting movement, while FIG. 3 shows the movable base 110 in the movable configuration. In the movable configuration, the first and second translating members 134, 135 can be in a raised position that raises the feet 141-144 relative to the wheels 161-164 (disengaged position). The feet 141-144 can be raised above the lowermost surface of one or all of the wheels 161, 164. In the fixed or braked configuration, the wheels 161-164 can be lifted off the ground surface and/or some or all of the weight of the movable base 110 is shifted to the feet 141-144 (engaged position). Friction between ground surface and the feet 141-144 can be greatly increased relative to friction between the wheels 161 and the ground surface (if still touching the ground surface). The movable base 110 can be in the fixed or braked configuration while supported at least partially on the feet 141-144 alone. The second frame 130 can be actuated from the movable configuration to the braked configuration by rotation of the screw 121 in a first direction to actuate the second frame 130. The second frame 130 can be actuated from the braked configuration to the movable configuration by rotation of the screw 121 in a second direction to actuate the second frame 130.

Figure 6:
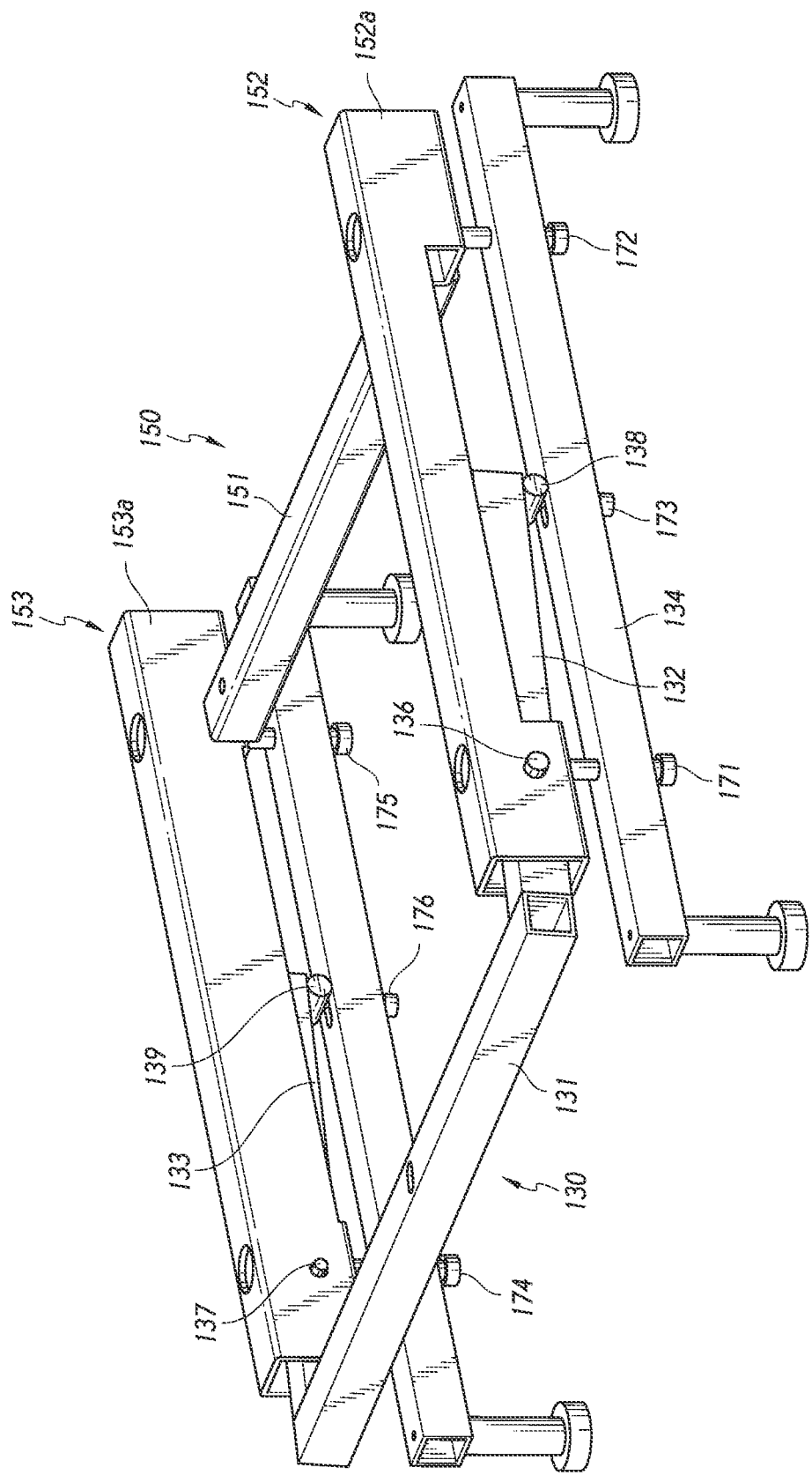
FIG. 6 shows further detail of the first frame and the second frame with portions of the first frame removed for clarity.
Figure 7:
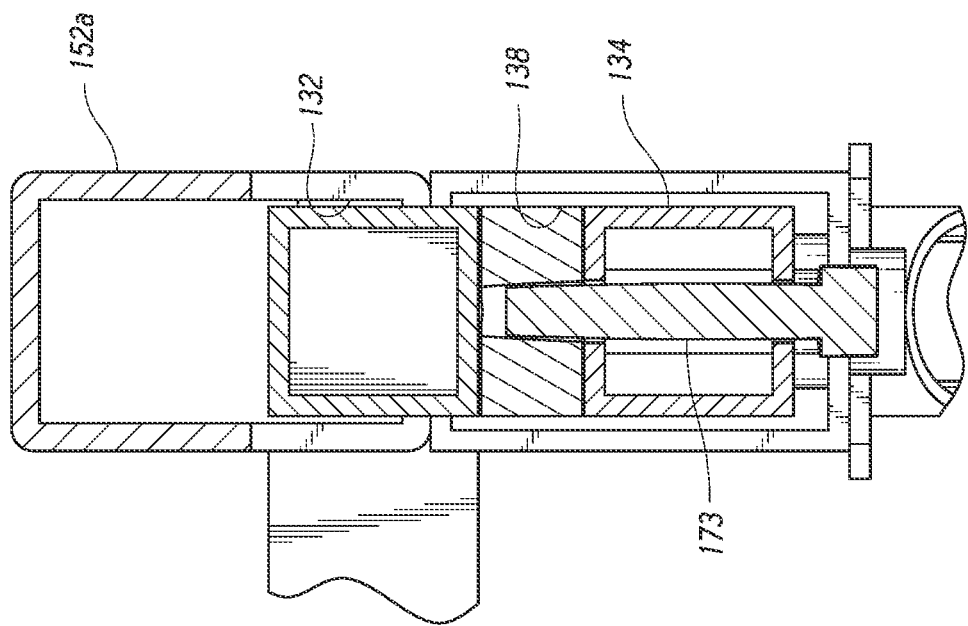
FIG. 7 shows a section view through a pivot point between the first frame and the second frame.

FIG. 6 shows the lower members 152b-c and 153b-c removed for clarity. The first frame 150 can include sliding shafts 171 and 172, and 174 and 175 along which the first and second translating members 134, 135 can translate, respectively. The first shaft 171 can be connected with the first end of the upper member 152a and extend through and/or connect with the first lower member 152b. Accordingly, an end portion of the sliding shaft 171 can be disposed within the hollow space of the first lower member 152b. The first translating member 134 can include an aperture that is received through which the sliding pin 171 is received to allow vertical translation of the translating member 134. Similarly, the second sliding shaft 172 can be coupled with the second end of the upper member 152a and/or the second lower member 152c and disposed within the hollow space therein. An aperture of the first translating member 134 can receive the second sliding shaft 172. Similarly, the third and fourth sliding shafts 174, 175 can be coupled with the upper member 153a and located within the respective first and second lower members 153b, 153c. Apertures of the second translating member 135 can receive the sliding shafts 174, 175 to facilitate vertical translation.

Pivot points 138 and/or 139 can also be mounted on shafts 173, 176. The shafts 173, 176 can extend through one or more slots within upper and lower sides of the respective first and second translating members 134, 135. The slots can extend along a longitudinal axis of the translating members. The shafts 173, 176 can be connected generally perpendicular with a longitudinal axis of the cylindrical member of the pivot points 138, 139. The slots facilitate movement (e.g., rolling or reduced friction sliding) of a cylindrical portion of the cylindrical members slightly with respect to an upper surface of the translating members. This can reduce friction between the lever members and the pivot points 138, 139.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A movable base, comprising:
a mounting location;
a superstructure providing support to the mounting location;
a first frame having a plurality of wheels for supporting the movable base on a ground surface; and
a second frame, comprising:
a plurality of spaced apart ground contact members, the second frame having an engaged position in which the ground contact members are in contact with the ground surface and a disengaged position in which the ground contact members are spaced above the ground surface;
a lever arm pivotably coupled to and disposed at least partially within a channel of the first frame, the lever arm pivoting between first and second positions; and
a screw actuator coupled to the lever arm to secure the lever arm in either or both of a first position corresponding to the engaged position of the spaced apart ground contact members or a second position corresponding to the disengaged position of the spaced apart ground contact members.

2. A movable base comprising:
a first frame assembly including a plurality of wheels;
a second frame assembly coupled with the first frame assembly and including a plurality of feet; and
a screw actuator including a screw member and a screw plate;
wherein the screw actuator is coupled with a lever member of the second frame assembly such that rotation of a screw in a first direction actuates the lever member to cause the plurality of feet to translate downward relative to the plurality of wheels, where translation of the plurality of feet downward lifts the plurality of wheels off a ground surface, and rotation of the screw in a second direction actuates the lever member to cause the plurality of feet to translate upward relative to the plurality of wheels allowing the weight of the movable base to cause the plurality of wheels to contact the ground surface;
wherein in a fixed configuration, the plurality of feet are at or below a lowermost level of the plurality of wheels and in a movable configuration the plurality of feet are raised above a lowermost surface of the plurality of wheels.

3. The movable base of claim 2, wherein the first frame assembly includes a lateral member, a first side, and a second side forming a U-shape.

4. The movable base of claim 2, wherein the lever member is a first lever member and wherein the second frame assembly includes a lateral member, the first lever member, and a second lever member coupled together to form a U-shape.

5. The movable base of claim 2, wherein the second frame assembly includes a translating member coupled with the lever member, one or more of the plurality of feet attached with the translating member.

6. The movable base of claim 5, wherein the translating member is mounted on a sliding shaft coupled with the first frame assembly.

7. The movable base of claim 2, wherein the plurality of wheels are caster wheels.

8. The movable base of claim 2, wherein the plurality of feet are disposed forwardly and rearwardly relative to the plurality of wheels.

9. The movable base of claim 2, wherein a screw plate is mounted on a superstructure of an umbrella and the screw is coupled with the second frame assembly via a pin.

10. The movable base of claim 2, wherein the screw is accessible through an aperture in an exterior cowl on an upper surface of the movable base.

11. The movable base of claim 2, wherein the lever member is disposed within and pivotably coupled with a member of the first frame assembly via a pin.

12. The movable base of claim 2, wherein a pivot point between a translating member and the lever member includes a cylinder.

13. The movable base of claim 12, wherein the pivot point includes a cylindrical member mounted on a shaft disposed within a slot on the translating member.

14. A movable base comprising:
- a first frame assembly including an upper channel member and two spaced apart lower channel members, the lower channel members each couple with a wheel assembly;
- a second frame assembly coupled with the first frame assembly, the second frame assembly including a lever and a plurality of feet coupled with the lever;
- a cover enclosing the first frame assembly and the second frame assembly; and
- an actuator accessible at an outside surface of the cover, the actuator configured to move a first end of the lever to cause the plurality of feet to be extended in a direction away from a bottom surface of the lower channel members to cause the plurality of feet to bear at least a portion of a weight of the movable base to provide a braking effect reducing or eliminating movement of the movable base.

15. The movable base of claim 14, wherein the cover comprises a cowl.

16. The movable base of claim 15, further comprising a superstructure disposed between the cowl and the first frame assembly and the second frame assembly.

17. The movable base of claim 16, wherein the superstructure comprises one or more walls or a support surface for containing and/or supporting a portion of the actuator.

18. The movable base of claim 17, wherein the actuator comprises a screw having a first end coupled with the lever and a second end having a driver interface, the second end being accessible at an outside of the cover.

19. The movable base of claim 14, further comprising one or more slots disposed through the first frame assembly and one or more shafts disposed through the one or more slots, the one or more shafts transferring pivoting motion of the lever to vertical motion of the plurality of feet.

20. The movable base of claim 19, further a transverse member coupled with the lever and having feet at each end thereof, the transverse member being coupled with the one or more shafts at spaced apart locations between the feet, the transverse member moving along a travel distance within the lower channel members upon actuation of the actuator.

* * * * *